(12) United States Patent
De Magalhaes

(10) Patent No.: US 8,627,202 B2
(45) Date of Patent: Jan. 7, 2014

(54) UPDATE AND SERIALIZATION OF XML DOCUMENTS

(75) Inventor: Arthus L De Magalhaes, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 12/889,330

(22) Filed: Sep. 23, 2010

(65) Prior Publication Data

US 2011/0283179 A1 Nov. 17, 2011

(30) Foreign Application Priority Data

May 14, 2010 (CA) .................................... 2702137

(51) Int. Cl.
*G06F 17/00* (2006.01)

(52) U.S. Cl.
USPC .......................................... 715/242; 715/234

(58) Field of Classification Search
USPC ................................................. 715/234, 242
See application file for complete search history.

(56) References Cited

U.S. PATENT DOCUMENTS

| | | | | |
|---|---|---|---|---|
| 6,675,353 | B1 * | 1/2004 | Friedman | 715/239 |
| 6,772,413 | B2 * | 8/2004 | Kuznetsov | 717/136 |
| 6,959,415 | B1 * | 10/2005 | Soderberg et al. | 715/234 |
| 7,231,394 | B2 * | 6/2007 | Walker et al. | 1/1 |
| 7,398,200 | B2 * | 7/2008 | Ie et al. | 704/9 |
| 8,082,493 | B2 * | 12/2011 | Sthanikam et al. | 715/234 |
| 8,082,496 | B1 * | 12/2011 | Leeds et al. | 715/255 |
| 8,196,135 | B2 * | 6/2012 | LaFontaine | 717/174 |
| 8,423,518 | B2 * | 4/2013 | Lafontaine et al. | 707/692 |
| 8,429,526 | B2 * | 4/2013 | Sthanikam et al. | 715/255 |
| 2003/0167446 | A1 * | 9/2003 | Thomas | 715/513 |
| 2005/0097110 | A1 | 5/2005 | Nishanov | |
| 2007/0005622 | A1 | 1/2007 | Fernandez et al. | |
| 2007/0271305 | A1 | 11/2007 | Chandraseker et al. | |
| 2008/0098412 | A1 | 4/2008 | Zhou et al. | |
| 2008/0140705 | A1 * | 6/2008 | Luo | 707/103 R |
| 2009/0006429 | A1 | 1/2009 | Champion et al. | |
| 2009/0006450 | A1 | 1/2009 | Champion et al. | |
| 2009/0172042 | A1 * | 7/2009 | Bracha et al. | 707/201 |
| 2009/0248624 | A1 | 10/2009 | Lammel et al. | |
| 2009/0254808 | A1 | 10/2009 | Yuan et al. | |

OTHER PUBLICATIONS

Liu et al., "Effective and Efficient Update of XML in RDBMS," SIGMOD'07, Jun. 12-14, 2007, Beijing, China, pp. 925-936.
Kogan et al., "Optimizing Runtime XML Processing in RElational Databases," Microsoft Corporation, S. Bressan et al. (Eds.): XSym 2005, LNCS 3671, pp. 222-236, Springer-Verlag Berlin Heidelberg 2005.
Fernandes et al., "inflatable XML Processing", pp. 2-20; 2005.

* cited by examiner

*Primary Examiner* — Andrew Dyer
(74) *Attorney, Agent, or Firm* — North Shore Patents, P.C.; Michele Liu Baillie

(57) ABSTRACT

A method, system, and computer program product for updating and serialization of a document, includes: assigning a unique ID to each node created in the document; materializing a root element start tag of the document; materializing a start tag for a child element of the root element; determining whether a change to the child element is required; in response to determining that the change to the child element is not required, skipping content of the child element; in response to determining that the change to the child element is required, updating the child element to form an updated element; pushing updated information for the child element into a mutation map; and serializing the document using the mutation map.

17 Claims, 11 Drawing Sheets

Update and serialization system 200

FIG. 3

```
1  <?xml version="1.0" encoding="UTF-8"?>
2  <root_element>              ← 302
3     <first_child>            ← 304
4        <inner_first_child>   ← 306
5           <node>text text</node>
6           <node>text text</node>
7           <node>text text</node>
8           <node>
9              <node>text text</node>
10             <node>text text</node>
11             <node>text text</node>
12             <node>text text</node>
13             <node>text text</node>
14             <node>text text</node>
15             <nestedChild>
16                <nestedChild>
17                   <nestedChild>
18                      <nestedChild>text</nestedChild>
19                   </nestedChild>
20                </nestedChild>
21             </nestedChild>
22             <node>text text</node>
23             <node>text text</node>
24          </node>
25          <node>text text</node>
26          <node>text text</node>
27       </inner_first_child>
28       <inner_second_child>value</inner_second_child>   ← 308
29    </first_child>            ← 310
30    <second_child>1234</second_child>   ← 312
31 </root_element>
```

```
1  <form:createClaim xmlns:form="http://soaassureservice.soabench.ibm.com">
2      <form:requestInfo xmlns:item="http://payload.soabench.ibm.com">    ←——— 402
3          <item:infrastructureMode>1</item:infrastructureMode>
4          <item:faultPercentage>0</item:faultPercentage>
5          <item:response25KxN>0</item:response25KxN>
6      </form:requestInfo>
7      <form:originalReport>    ←——— 404
8          <item:reportBody> 10 MB </item:reportBody>                400
9      </form:originalReport>
10     <form:claim xmlns:item="http://data.soabench.ibm.com">
11         <item:claimId />
12         <item:policyId>PS100001</item:policyId>    ←——— 406
13         <item:claimState>New</item:claimState>
14         <item:lossDate>20060621T19:13:26.937Z</item:lossDate>
15         <item:noticeDate>20060621T19:13:26.937Z</item:noticeDate>
16         <item:claimFormImage>aWin</item:claimFormImage>
17         <item:repairShop xsi:nil="true" />
18         <item:paymentDate xsi:nil="true" />
19         <item:thirdPartyPolicyId>TP123435235</item:thirdPartyPolicyId>
20         <item:thirdPartyVehicle>
21             <item:vin>INXBF18E3893890K343</item:vin>
22             <item:registrationMark>TQF3345</item:registrationMark>
23             <item:manufacturer>Ford</item:manufacturer>
24             <item:model?Explorer V</item:model>
25             <item:year>2002</item:year>
26             <item:estimatedValue>12345.67</item:estimatedValue>
27             <item:estimatedValueDate>
28                 20060621T19:13:26.937Z
29             </item:estimatedValueDate>
30         </item:thirdPartyVehicle>
31         <item:policyHolderBlame>0</item:policyHolderBlame>
32         <item:thirdartyAcceptedBlame>1</item:thirdPartyAcceptedBlame>
33     </form:claim>
34 </form:createClaim>
```

602
```
<?xml version="1.0" encoding="UTF-8"?>
<target>
    <header xmlns:hd="ibm.com/headers">
        <hd:JMSHeader headerType="mainHeader">
            <info>...</info>
        </hd:JMSHeader>
    </header>
    <payload xmlns:ns0="ibm.com/ns0">
```

Payload element 506
```
        <first_child>
            <grandchild ns0:attr1="123" />    un-materialized portion
        </first_child>
```
```
    </payload>
</target>
```

604
```
<?xml version="1.0" encoding="UTF-8"?>
<target>
<header xmlns:hd="ibm.com/headers">
<hd:JMSHeader headerType="mainHeader">
<info>...</info>
</hd:JMSHeader>
</header>
<payload xmlns:ns0="ibm.com/ns0">
```

Payload element 606
```
<first_child performance="ON">
<grandchild ns0:attr1="123" />
</first_child>
```
```
</payload>
</target>
```

608
```
<?xml version="1.0" encoding="UTF-8"?>
```

Payload element 610
```
<payload xmlns:ns0="ibm.com/ns0">
<first_child>
<grandchild ns0:attr1="123" />
</first_child>
</payload>
```

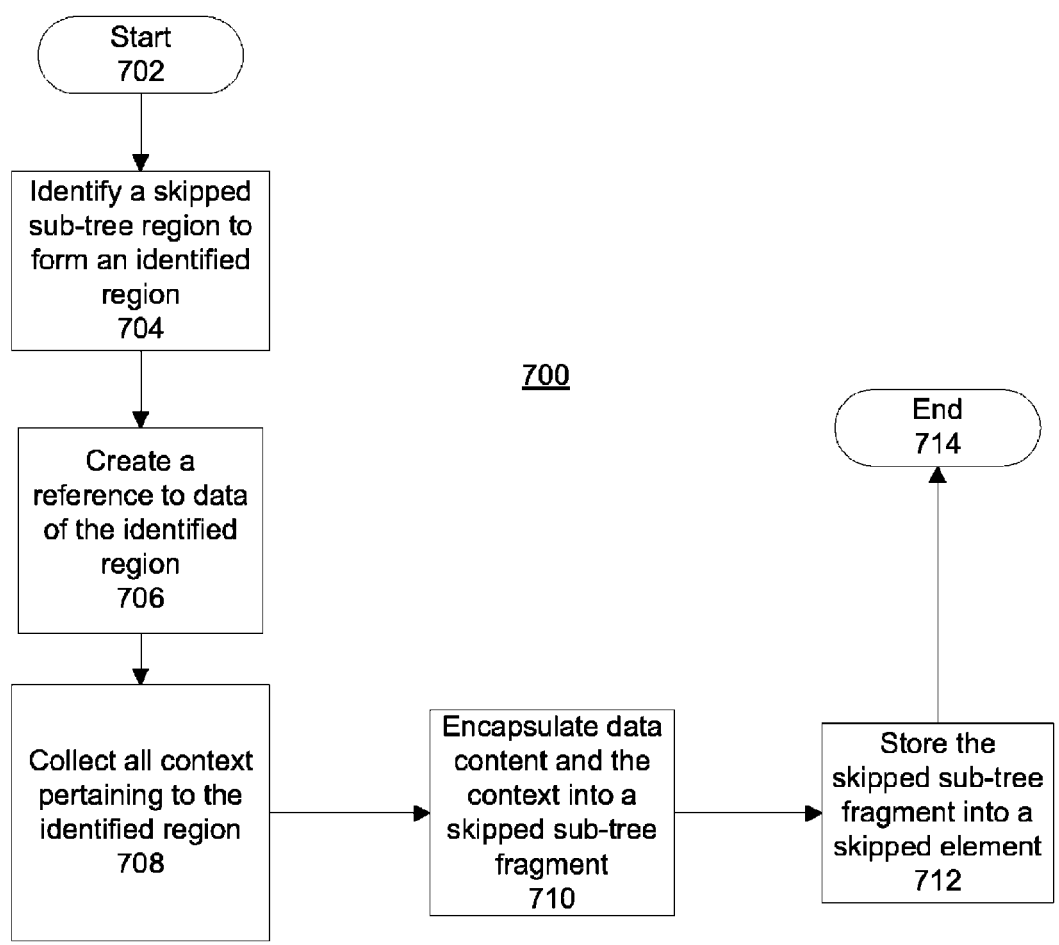

UPDATE AND SERIALIZATION OF XML DOCUMENTS

CROSS-REFERENCE TO RELATED APPLICATIONS

The present application claims priority to Canadian Patent Application No. 2702137, filed on May 14, 2010.

BACKGROUND

1. Technical Field

This disclosure relates generally to processing of documents in a data processing system and more specifically for random update and serialization of XML documents.

2. Description of the Related Art

Many applications need to perform random updates to an extensible markup language (XML) document followed by serialization of the entire document. The applications for such scenario are numerous, because the need to update and serialize XML documents is a core requirement of many services oriented architecture (SOA) transactions and products. In current processing environments, streams of data are processed that cannot be reset, such as incoming network data. A capability of performing random access and updates of documents represented in the streams of data is in very high demand. Furthermore, serialization of such documents is a next natural step that most applications require, with both steps having a common need for memory and time efficiency.

A typical need in document processing systems is to dramatically reduce time spent handling XML documents. Applications and associated products need to very efficiently update part of a document and serialize the resulting document for consumption in other parts of a system. A bottleneck typically occurs with unnecessary materialization of a whole document into objects, due to a random update nature of these applications. Generally existing XML parsing solutions appear to focus on the reading of the document rather than managing updates to the content efficiently.

A general solution to update an XML document uses a Document Object Model (DOM), which typically has very poor performance because of the materialization of the complete document into objects. On the other hand, a general fast serialization solution for XML documents uses Simple API for XML, (SAX) or Streaming API for XML (StAX), but neither solution provides a capability to randomly update. In an example of a current solution, a hybrid representation of materialized and un-materialized data is only sequential. The solution is only capable of materializing a portion of the document in document order and leaving the rest of the document un-materialized.

In another example of a current solution, an "inflatable node" is used which requires references to the offset in the byte array. This means a "wrapper" in the form of the inflatable node must exist for each node. The inflatable node information requires additional memory, thereby adding to memory requirements of the document.

In another example of a current solution data is always in binary form and a process to update that binary data is provided. However, any updates from memory have to be converted into a correct binary format first before being applied. The process also has a drawback because a mutation in one part of the binary data might require changes in other parts of the data stream.

In another example of attempting to solve both requirements of efficiently updating part of a document and serializing the resulting document, a typical solution uses Eclipse™ Modeling Framework (EMF). Although use of EMF is an improvement over DOM, the solution still lacks optimal random update and serialization that many products require. EMF loads the entire document in memory and therefore typically does not have the necessary performance required, especially for scenarios where only small parts of the document are mutated.

BRIEF SUMMARY

Embodiments of a method, system, and computer program product for updating and serialization a document assign a unique ID to each node created in the document, materialize a root element start tag of the document, materialize a start tag for a child element of the root element and determine whether a change to the child element is required. In response to determining that the change to the child element is not required, the method, system and computer program product skip content of the child element. In response to determining that the change to the child element is required, the method, system and computer program product update the child element to form an updated element. The method, system and computer program product further push updated information for the child element into a mutation map and serialize the document using the mutation map.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

FIG. 3 is a textual representation of a sample document portion, in accordance with one embodiment of the disclosure;

FIG. 4 is a textual representation of another sample document portion, in accordance with one embodiment of the disclosure;

FIG. 6 is a textual representation of a serialization example in accordance with various embodiments of the disclosure;

FIG. 7 is a flowchart of a sub-tree fragment process example in accordance with various embodiments of the disclosure;

DETAILED DESCRIPTION

Figure 1:
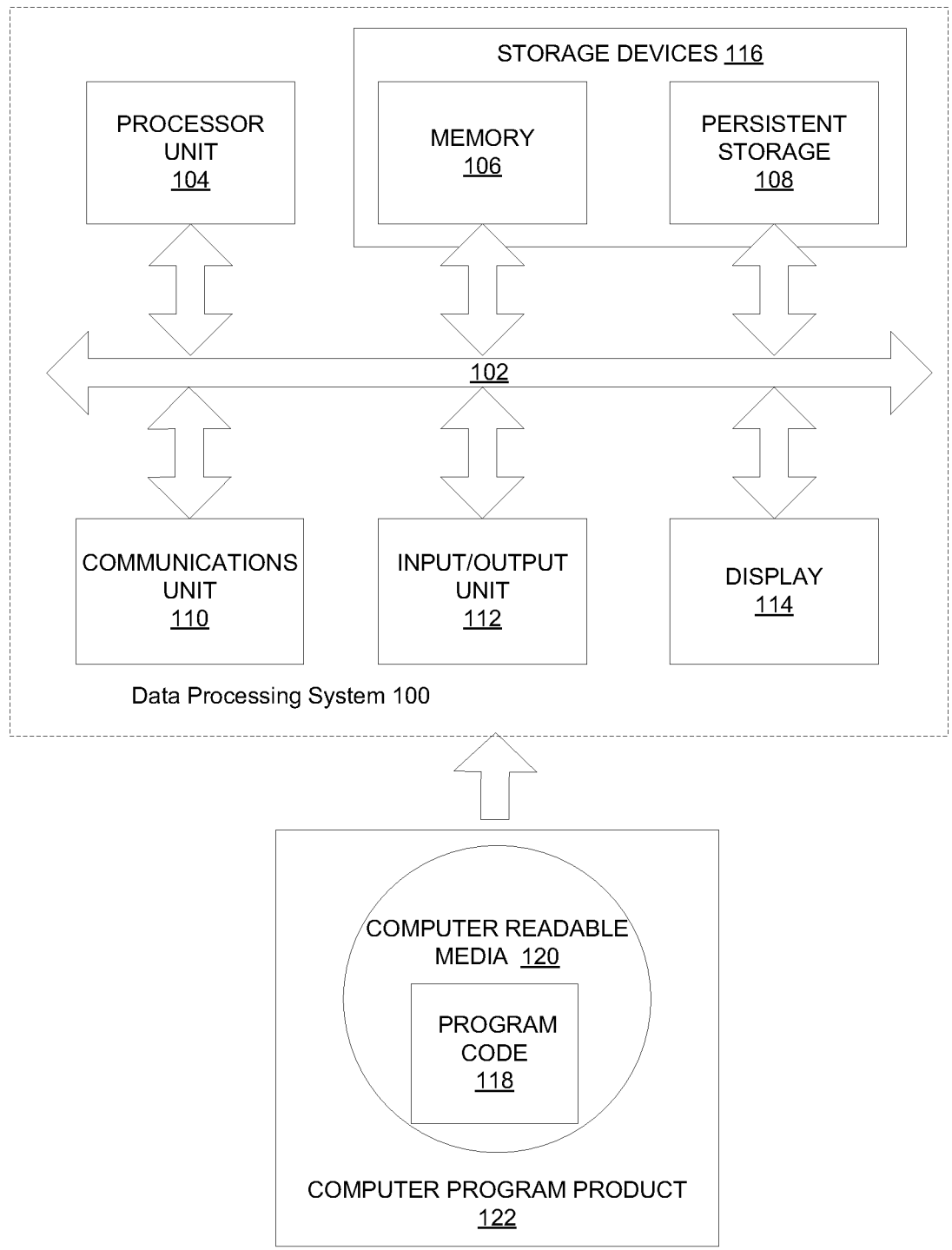
FIG. 1 is a block diagram of an exemplary data processing system operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product tangibly embodied in any medium of expression with computer usable program code embodied in the medium.

Computer program code for carrying out operations of the present disclosure may be written in any combination of one or more programming languages, including an object oriented programming language such as Java™, Smalltalk, C++, or the like and conventional procedural programming languages, such as the "C" programming language or similar programming languages. Java and all Java-based trademarks and logos are trademarks of Sun Microsystems, Inc., in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Turning now to FIG. 1 a block diagram of an exemplary data processing system operable for various embodiments of the disclosure is presented. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instructions are in a functional form on persistent storage 108. These instructions may be loaded into memory 106 for execution by processor unit 104. The processes of the different embodiments may be performed by processor unit 104 using computer-implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 may be any hardware apparatus that may store data. Memory 106, persistent storage 108 and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

According to an illustrative embodiment, a computer-implemented process for updating and serialization, assigns a unique ID to each node created in a document, materializes a root element start tag of the document, materializes a start tag for a child element of the root element and determines whether a change is required. Responsive to a determination that a change is not required, skips content of the child element and responsive to a determination that a change is required, updates the child element to form an updated element. The computer-implemented process further pushes updated information for the child element into a mutation map and serializes the document using the mutation map.

Using data processing system 100 of FIG. 1 as an example, an illustrative embodiment provides the computer-implemented process stored in memory 106, executed by processor unit 104, for updating and serialization. Processor unit 104 assigns a unique ID to each node created in a document, materializes a root element start tag of the document, materializes a start tag for a child element of the root element and determines whether a change is required. Responsive to a determination that a change is not required, processor unit 104 skips content of the child element and responsive to a determination that a change is required, updates the child element to form an updated element in memory 106. Processor unit 104 further pushes updated information for the child element into a mutation map maintained in storage devices 116 and serializes the document using the mutation map.

In an alternative embodiment, program code 118 containing the computer-implemented process may be stored within computer readable media 120 as computer program product 122. In another illustrative embodiment, the process for updating and serialization may be implemented in an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the apparatus executes the computer executable program code to direct the apparatus to perform the process.

Figure 2:
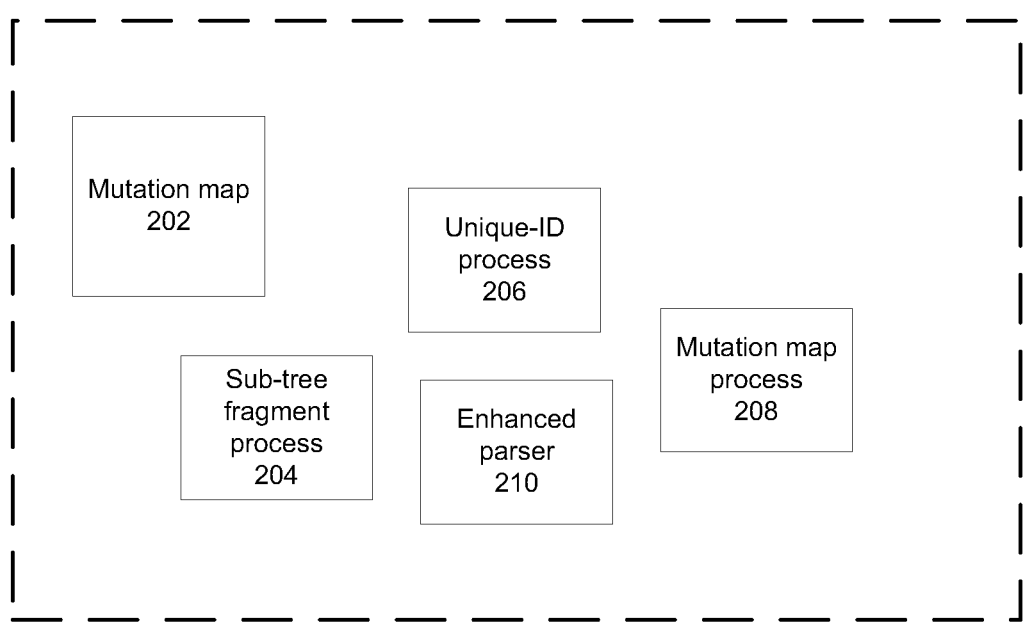
FIG. 2, is a block diagram of components of an update and serialization system in accordance with various embodiments.

With reference to FIG. 2, a block diagram of an update and serialization system in accordance with various embodiments of the disclosure is presented. Update and serialization system 200 is an example of an embodiment of the disclosure.

Update and serialization system 200 is an enhanced system that avoids materializing data into objects as much as possible. A "lazy materialization" technique provided by update and serialization system 200 enables an application to randomly update parts of a document efficiently because a performance impact of initiating new objects in memory is reduced. The enhanced system provides a capability, including mutation map 202, sub-tree fragment process 204, unique ID process 206, mutation map process 208 and enhanced parser 210, to re-use original document data for efficient hybrid serialization between mutated objects and original unchanged portions of the document.

Deferred materialization while randomly updating the document is provided through use of sub-tree fragment process 204. Sub-tree fragment process 204 is a process that encapsulates a specific region of a document and corresponding context information to enable enhanced parser 210 to resume parsing of a fragment at a later time. Concurrent with each update, mutation map process 208 provides a listing of all the updates and regions of unchanged data between updated nodes maintained in a data structure of mutation map 202. This unique data structure enables optimized serialization, which will not materialize any unnecessary additional nodes.

A skipped sub-tree fragment reference is used to serialize the contents of a node that has been moved to a different container, (and updated) without materializing a single associated sub-tree node, which further demonstrates the effectiveness of mutation map 202 data structure. The enhanced system provides a capability to move containers from one XML document in memory to another document, change the name, and serialize the data efficiently.

Mutation map 202 is a data structure that can have two possible entries (elements) in the form of a reference to a node object that has been mutated, or a reference to a native representation of a certain region of the document. The purpose of mutation map 202 is to provide a "serialization map" that will indicate to update and serialization system framework, which native sections to re-use and which mutated nodes to traverse, all in proper document order to provide an accurate and correct output. This hybrid data structure provides a capability for efficient serialization of a mutated document.

Mutation map process 208 is a process used to create and maintain mutation map 202. Mutation map process 208 is a process for maintaining a proper sequence of items associated with a document being processed. The items refer to native sections to re-use and mutated nodes to traverse.

Sub-tree fragment process 204 is a process providing a capability to define and encapsulate information related to a document fragment into a single object called a skipped sub-tree fragment. The skipped sub-tree fragment is stored within the skipped element of the document and is used when the content is traversed at a later time.

Unique ID process 206 is a process providing a capability to assign a unique integer value to each node of a document. Assignment of a unique ID enables a node comparison operation to identify correct sequencing of a node relative to another node in the document stream.

Enhanced parser 210 provides a capability to parse extensible markup language documents using the other components of update and serialization system 200. Enhanced parser 210 is enabled to use mutation map 202 for efficient serialization of an updated document.

With reference to FIG. 3, a textual representation of an example of a document portion, in accordance with one embodiment of the disclosure is presented. Document portion 300 is a code snippet representing an element hierarchy in a nested XML document.

Using the example of FIG. 3 a series of operations is performed on elements of document portion 300 including changing a value of <second_child> 312 to "5678," changing a value of <inner_second_child> 308 to "new value" and serialize the updated document.

To accomplish changing a value of <second_child> 312 to "5678,"<root_element> 302 is materialized. Only the start-tag of <root_element> 302 is materialized initially. A child of <root_element> 302, in the form of <first_child> 304 is materialized as well. Again only the start-tag of <first_child> 304 is materialized initially. The contents of <first_child> 304 bounded by <first_child> 304 start-tag and <first_child> 310 end-tag are skipped using a "sub-tree fragment process" described later in FIG. 7.

Another process used concurrently, is a process for unique ID assignment of nodes. This process provides a capability to insert elements into a "mutation map" data structure. The process for unique ID assignment of nodes further enables rapid comparison of the document order of two nodes. The process for unique ID assignment of nodes is further described in FIG. 8.

After skipping the element of <first_child> 304 and storing the associated skipped sub-tree fragment inside of the element, <second_child> 312 is materialized and the value is changed. As soon as the value of <second_child> 312 is changed, a "mutation map" process is used. The mutation map process is further described in FIG. 9.

The operation of changing the value of <second_child> 312 is complete. Returning to <first_child> 304 an element of <inner_first_child> 306 is processed to materialize only the start-tag. The remainder of <inner_first_child> 306 is skipped using the sub-tree fragment process, to arrive at <inner_second_child> 308, which is now updated. The process of updating <inner_second_child> 308 pushes the element into a mutation map before the entry of <second_child> 312. The order is determined by comparison of the values of the two node IDs. The operation of changing the value of <inner_second_child> 308 to "new value" is complete.

Examination of the mutation map reveals a set of items reflecting the operations performed, including:
item 1=reference to the region from the beginning of document up to the character before the <inner_second_child> 308 start tag,
item 2=reference to the mutated <inner_second_child> 308 node,
item 3=reference to region from the character after the <inner_second_child> 308 end tag up to the character before <second_child> 312
item 4=reference to the mutated <second_child> 312 node,
item 5=reference to the region from the character after the <second_child> 312 end tag up to the end of the document.

The mutation map efficiently "maps" the serialization process. The native references to certain regions of the document will be used to output that data quickly, while the mutated nodes will be traversed to output respective updated data. The end result will be an updated document that is correct and accurate. The processes just described improve efficiency by avoiding unnecessary object materialization. The serialization operation for the document is complete.

With reference to FIG. 4, a textual representation of another example of a portion of a document in accordance with various embodiments of the disclosure is presented. Document portion 400 provides a code snippet for an example of randomly choosing members of a document, moving and updating members into a new container and serializing a newly built XML document using techniques of update and serialization system 200 of FIG. 2.

In this example members of an incoming message request are selected, and another XML document is created, which is serialized for a framework to consume. The example includes an operation which obtains a value of <item:policyID> 406, appends a string of "123" and pushes the updated value into a new child (called <customer_ID>) of <customer_archive>. The example further obtains an item of <form:originalReport> 404 and pushes the item into a new child (called <incident_report>) of <customer_archive>. The example further serializes the newly built <customer_archive> document.

When performing the first operation, nodes of <form:requestInfo> 402 and <form:originalReport> 404 are skipped using the sub-tree fragment skipping process of FIG. 7. The changed (appended "123") value of <item:policyID> 406 is copied into the <customer_archive>, with the new name <customer_ID>). Note that <form:originalReport> 404 had an item comprising a "10 MB" child, which was not materialized because the parent element was skipped. Because a new child is added to the new XML document (with root <customer_archive>), the new child will be pushed into the new document mutation map, using the mutation map process of FIG. 9.

In the second operation <form:originalReport> 404 is revisited, and a reference to it is copied into <customer_archive> by mutating just the start-tag of <form:originalReport> 404 to make the name <incident_report>. Using the unique ID process of FIG. 8, a determination is made that the new node comes before the mutated <customer_ID> node. A feature of the mutation map process of FIG. 9 is used to avoid unnecessary materialization. This node contains sub-tree contents, which are intact and contain over 10 MB of data. Because the node was skipped once; the boundaries of an associated sub-tree region are already identified. This information is placed inside a "region reference" item that follows the <incident_report> item entry in the mutation map.

The serialization operation may now be performed efficiently. Using the sequence indicated in the mutation map, serialization begins with the start-tag of <incident_report>, followed by the native region of <form:originalReport> 404 (without materialization), followed by the mutated node <customer_ID>.

This above example further demonstrates the efficiency of random update and serialization system 200 of FIG. 2. Embodiments of the disclosure can be applied to a vast series of scenarios including query and copy of specific values, modification of elements anywhere, in a document that require the resulting mutated document to be serialized and be consumed by a next application.

Figure 5:
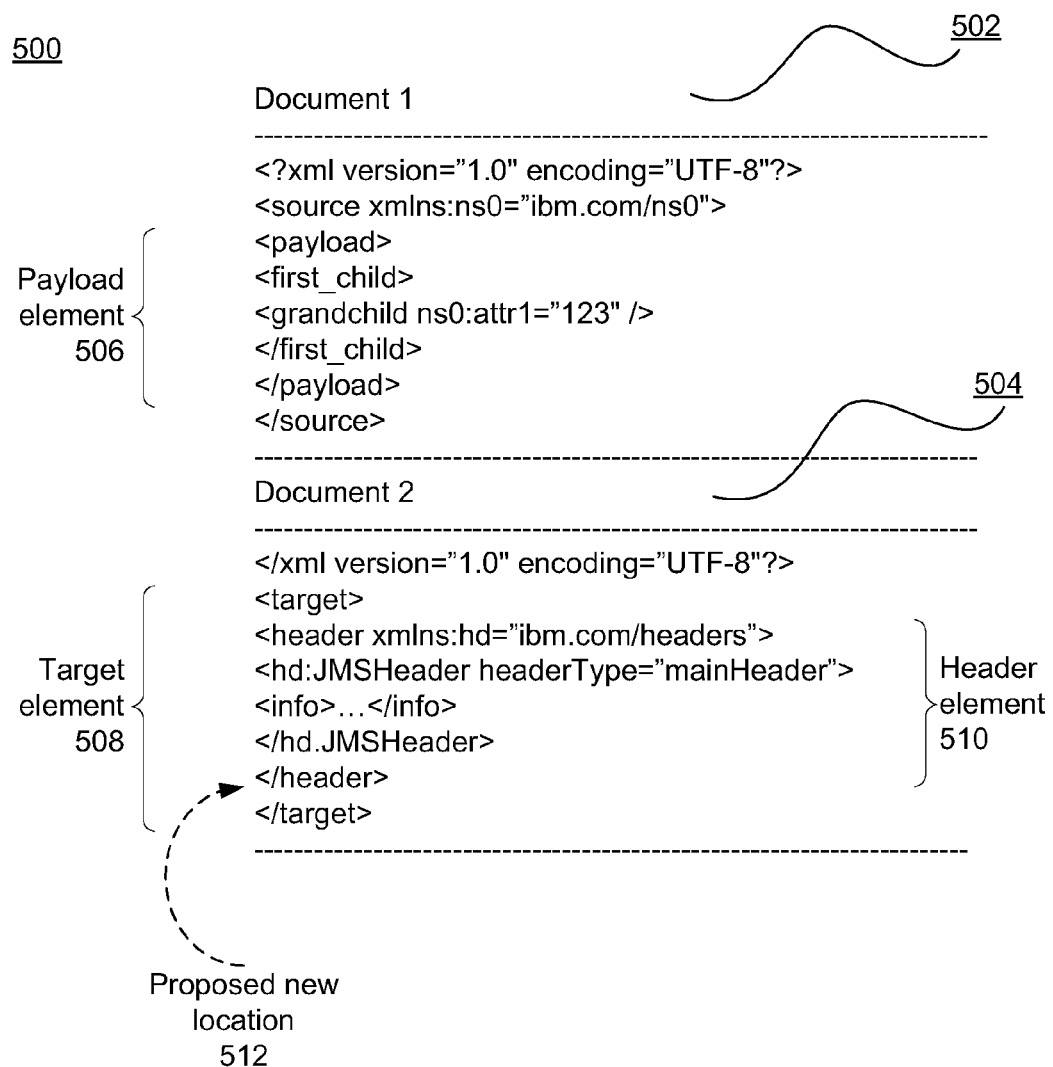
FIG. 5 is a textual representation of an encapsulation example in accordance with various embodiments of the disclosure.

With reference to FIG. 5, a textual representation of an encapsulation example in accordance with various embodiments of the disclosure is presented. Example 500 provides a sample of encapsulation of context information used to ensure serialization is effectively performed using techniques of update and serialization system 200 of FIG. 2.

Using techniques of update and serialization system 200 of FIG. 2 all contexts related to the skipped content of an XML document, such as namespaces and schema information is encapsulated. The technique also provides a capability for serialization-time namespace handling in a manner not previously supported in typical current solutions. Using example 500, consider document 502 and document 504.

Document 502 is traversed to reach <payload> element 506, without materializing any of sub-tree elements in document 502. A move of <payload> element 506 from document 502 to the last child of element <target> 508 in document 504 is scheduled. Placement of the element is after header element 510 at proposed location 512. Details of this mutation (the "move") illustrate how the update and serialization process of the disclosure optimizes for random updates of an XML document followed by serialization.

The contents of <payload> element 506 are skipped but information associated with the in-scope namespaces, schema information, parsing DFA, is gathered. This information is encapsulated into a fragment. When the fragment (comprising a skipped sub-tree) is moved into a new target, one of the previous in-scope namespaces (ns0) is identified as no longer in-scope in the new target. However the namespace might be needed in an un-materialized portion of <payload> element 506. Therefore the namespace declaration is carried forward with <payload> element 506, as seen in FIG. 6.

With reference to FIG. 6, a textual representation of a serialization example in accordance with various embodiments of the disclosure is presented. Example 600 provides a continuation of the encapsulation of context information of FIG. 5 to ensure serialization is effectively performed using techniques of update and serialization system 200 of FIG. 2.

Code snippet 602 depicts <payload> element 506 relocated into document 504 of FIG. 5. In terms of serialization, <payload> element 506 can now safely be serialized on its own (re-using the bytes for the un-materialized portion) while still producing a well-formed XML document. Typical previous solutions related to this subject do not handle namespaces because of issues such as this, where special handling and guards must be in place to ensure all serialized documents can be read again as well-formed XML documents.

To expand on this example, schema information that was encapsulated with this fragment can be examined. For example in code snippet 604, <first_child> in <payload> element 606 could have a schema element declaration that specified a default value of "ON" for an attribute called "performance". An illustrative embodiment keeps track of the schema type of the skipped element and the proper deterministic finite automaton (DFA) and related states internal to an enhanced parser, providing a capability to validate the skipped and moved <first_child> element and properly receive the "performance" attribute from the schema. Therefore the correct form of document 604 can be serialized to become document 604 comprising <payload> element 606.

Having namespace and schema related information available during serialization, even after mutation (the move) has occurred across documents, can be essential in producing well-formed and valid XML documents. The update and serialization framework double checks to ensure data to be serialized is well formed by checking in-scope namespaces against namespaces declared in the element that will be serialized. In the original document, document 502 of FIG. 5, if <payload> element 506 was serialized immediately without moving the element into another tree first, the update and serialization framework would first mutate the start tag of <payload> element 506 to contain the namespace declaration for "ns0", and then proceed to serialize with a mutation map hybrid structure which is the mutated start tag of <payload> and the un-materialized sub-tree. The result will be the well-formed XML document of document 608.

With reference to FIG. 7, a flowchart of a sub-tree fragment process example in accordance with various embodiments of the disclosure is presented. Process 700 provides an example of a sub-tree fragment process used in the skipping of element contents of a document portion 300 of FIG. 3 using techniques of update and serialization system 200 of FIG. 2.

Process 700 starts (step 702) and identifies a skipped sub-tree region to form an identified region (step 704). For example, a region to be skipped may be defined by data corresponding to the area that starts at the character following the <first_child> 304 start-tag of FIG. 3 and ends at the character preceding the </first_child> 310 end-tag. An important distinction is made between a reference and a copy of a document. Typically every parser uses some form of temporary internal storage of the document, such as data buffers, and it is this internal representation of the document that should be referenced, for example, the start and end offset of the skipped region. Process 700 creates a reference to data of the identified region (step 706).

Process 700 collects all contexts pertaining to the skipped sub-tree (step 708). The context information typically includes such items as namespace declarations, schema types, parser events, DFA states, and other descriptive information related to the data. Process 700 encapsulates the content data and the context into a single object known as a "skipped sub-tree fragment" (step 710). Process 700 stores the "skipped sub tree fragment" into a skipped element (step 712) and terminates (step 714). In the example, the "skipped sub tree fragment" is stored into the skipped element of <first_child> 304 of FIG. 3 to be used if the content is traversed at a later time.

Figure 8:
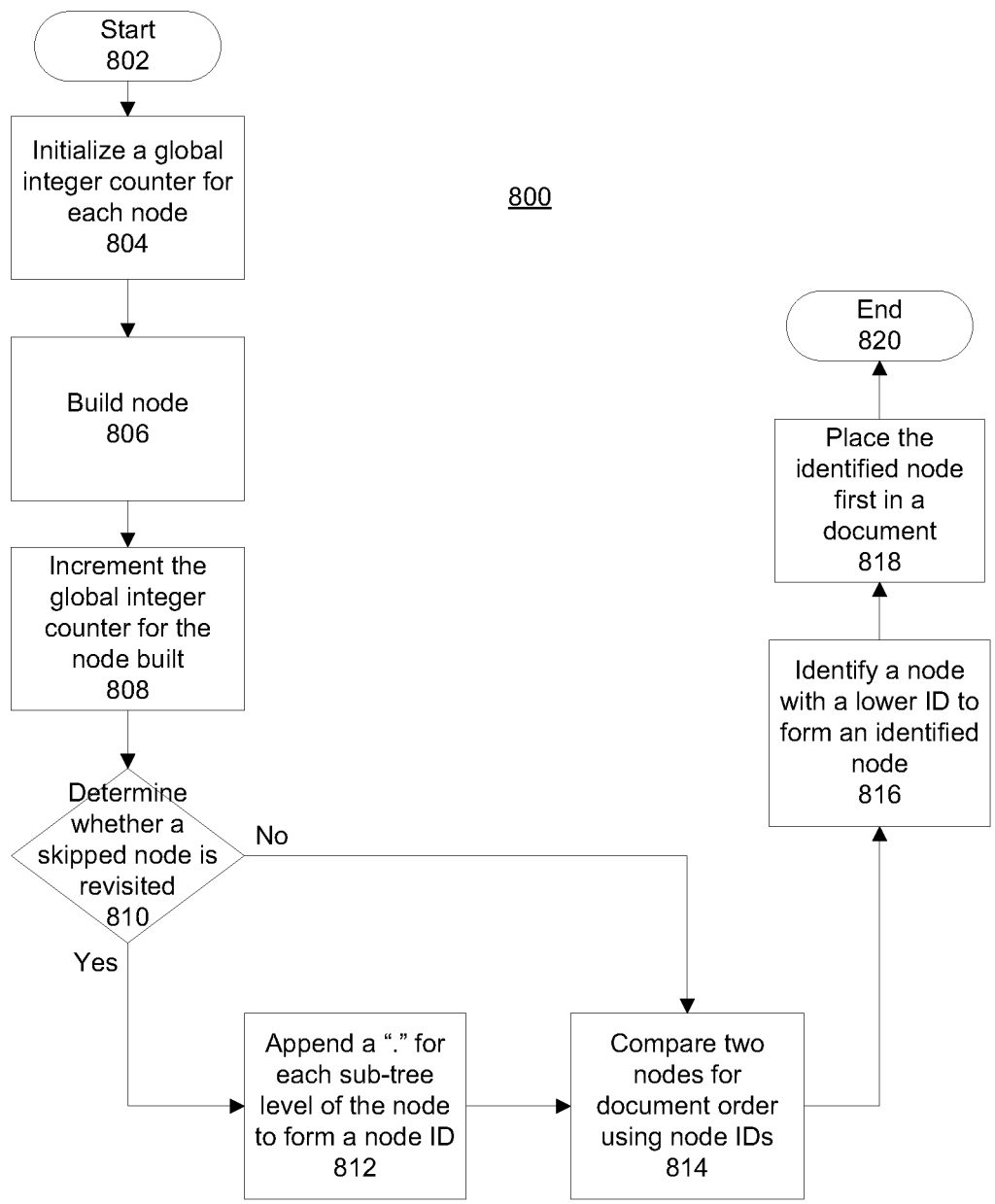
FIG. 8 is a flowchart of a unique identifier process example in accordance with various embodiments of the disclosure.
Figure 9:
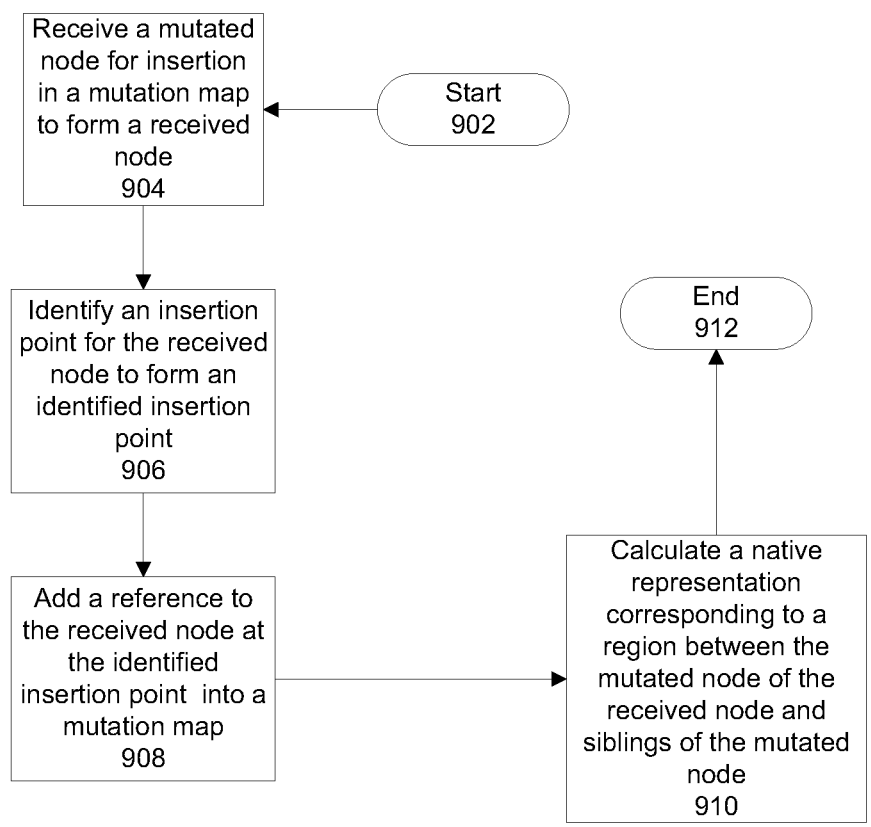
FIG. 9 is a flowchart of a "mutation map" process example in accordance with various embodiments of the disclosure.

With reference to FIG. 8, a flowchart of a unique identifier process in accordance with various embodiments of the disclosure is presented. Process 800 provides an example of a unique identifier process for document order comparison used in the techniques of update and serialization system 200 of FIG. 2.

Process 800 starts (step 802) and initializes a global integer counter for each node (step 804). A counter maintains an identifying unique value or count for each of the nodes of a document being processed. Process 800 builds a node (step 806). Process 800 increments a counter for the node that was built (step 808). For example, in a hierarchy of nodes, each node of a lower level of a hierarchy has a unique number identifying the node and indicating a relative position with respect to other nodes in the hierarchy. Until a node is skipped, the count number is assigned in normal order. For example, a first element of a document, <root_element>, receives an identifier of 1 and a next element in sequence, a <first_child>, receives an identifier of 2. When a node is skipped, the counter continues regularly because there is no need to keep track of how many nodes are skipped, which makes the process more efficient. Continuing the example, a next sequential element, <second_child>, receives an identifier of 3.

Process 800 determines whether a skipped node is revisited (step 810). When a determination is made that a skipped node is revisited a "yes" result is obtained. When a determination is made that a skipped node is not revisited a "no" result is obtained. When a "yes" result is obtained, a "." is appended for each sub-tree level of the node to form a node ID (step 812). For example, when the skipped <first_child> node is revisited and traversed to children, an ID of 1.1 is assigned to an <inner_first_child> node, and ID of 1.1.1 to a corresponding first child of the <inner_first_child> node. When a "no" result is obtained, process 800 skips to step 814.

Process 800 compare two nodes for document order, using node IDs (step 814). Node ID comparison is performed using the string of level identifiers for each node of the comparison. Process 800 performs for every "level" (a level is the number between the dots "."), a comparison of the identifier numbers of each node. Process 800 identifies a node with a lower identifier, of the pair of nodes to form an identified node (step 816). Process 800 places the lowest identified node first in the document (step 818) and terminates thereafter. For example, a deeply nested node with an identifier of 3.4.5.3.7.18.2 can be very quickly determined to come prior to the node with an identifier of 3.4.5.3.7.18.3. Sequencing of nodes may thus be performed to ensure document order.

With reference to FIG. 9, a flowchart of a "mutation map" process example in accordance with various embodiments of the disclosure is presented. Process 900 provides an example of a "mutation map" data structure and associated process used in the techniques of update and serialization system 200 of FIG. 2.

The "mutation map" is a data structure that can have two possible types of entries or elements in the form of a reference to a node object that has been mutated, or a reference to a native representation of a certain region of the document. The purpose of the "mutation map" is to provide a "serialization map" that defines what native sections to re-use and what mutated nodes to traverse, all in document order to provide an accurate and correct output. This hybrid data structure provides a capability for fast serialization of a mutated document.

Process 900 starts (step 902) and receives a mutated node for insertion in a mutation map data structure to form a receive node (step 904). Process 900 identifies an insertion point for the received node to form an identified insertion point (step 906). Process 900 inserts a reference to the received node at the identified insertion point into a mutation map (step 908).

The map is searched (binary search) to find the correct insertion spot for the node that has been mutated using a unique ID previously assigned using the unique identifier process 800 of FIG. 8. The incoming mutated node is compared with all other nodes inside the mutation map to maintain the mutation map in document order.

Process 900 calculates a native representation (should be simple pointers such as object/integer pair for buffers) corresponding to a region between the mutated node, as the received node, and siblings of the mutated node in the mutation map (step 910). Process 900 terminates thereafter (step 912).

Figure 10:
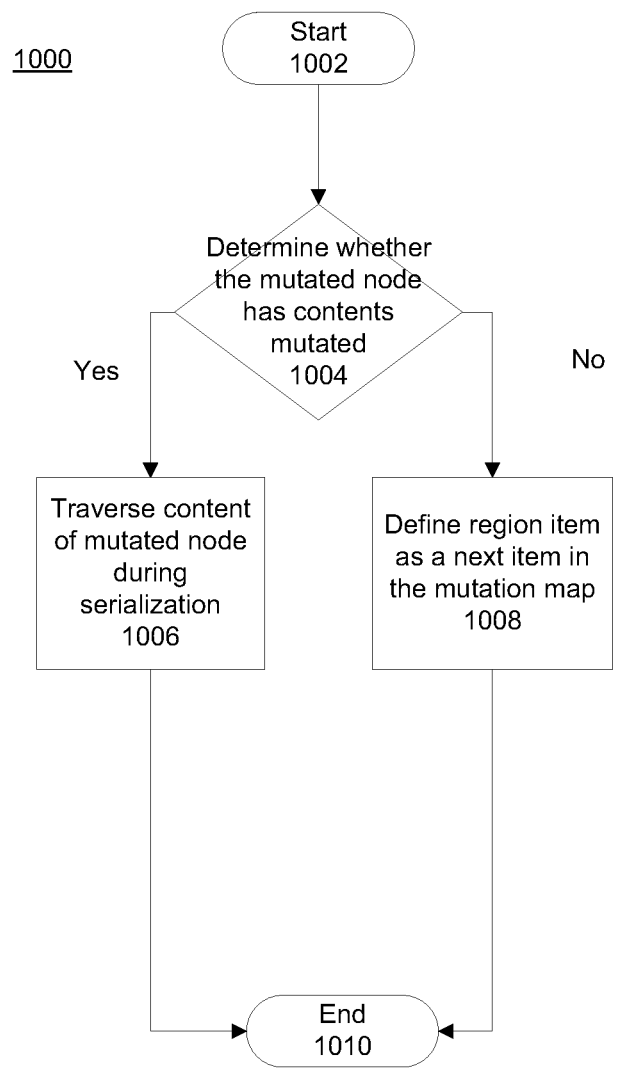
FIG. 10 is a flowchart of a serialization process example in accordance with various embodiments of the disclosure.

With reference to FIG. 10, a flowchart of a serialization process example in accordance with various embodiments of the disclosure is presented. Process 1000 provides an example of a portion of a serialization process used in the update and serialization system 200 of FIG. 2.

Process 1000 starts (step 1002) and determines whether the mutated node has contents mutated (step 1004). When a determination is made that the mutated node has contents mutated, a "yes" result is obtained. When a determination is made that the mutated node does not have contents mutated, a "no" result is obtained. When a "yes" result is obtained process 1000 traverses content of the mutated node during serialization (step 1006) with process 1000 terminating thereafter (step 1010).

When a "no" result is obtained in step 1004, process 1000 defines a region item as a next item in the mutation map (step 1008) with process 1000 terminating thereafter (step 1010). For nodes that have only the start-tag mutated (including namespace and attribute declarations), the mutation map will have a more advanced "region item" as a next item in the map. The region of native data that can be re-used includes the sub-tree content of the node. Processing is typically fast when the node itself has been skipped, because a skipped sub-tree fragment reference is used to identify exact boundaries of the content reference.

Figure 11:
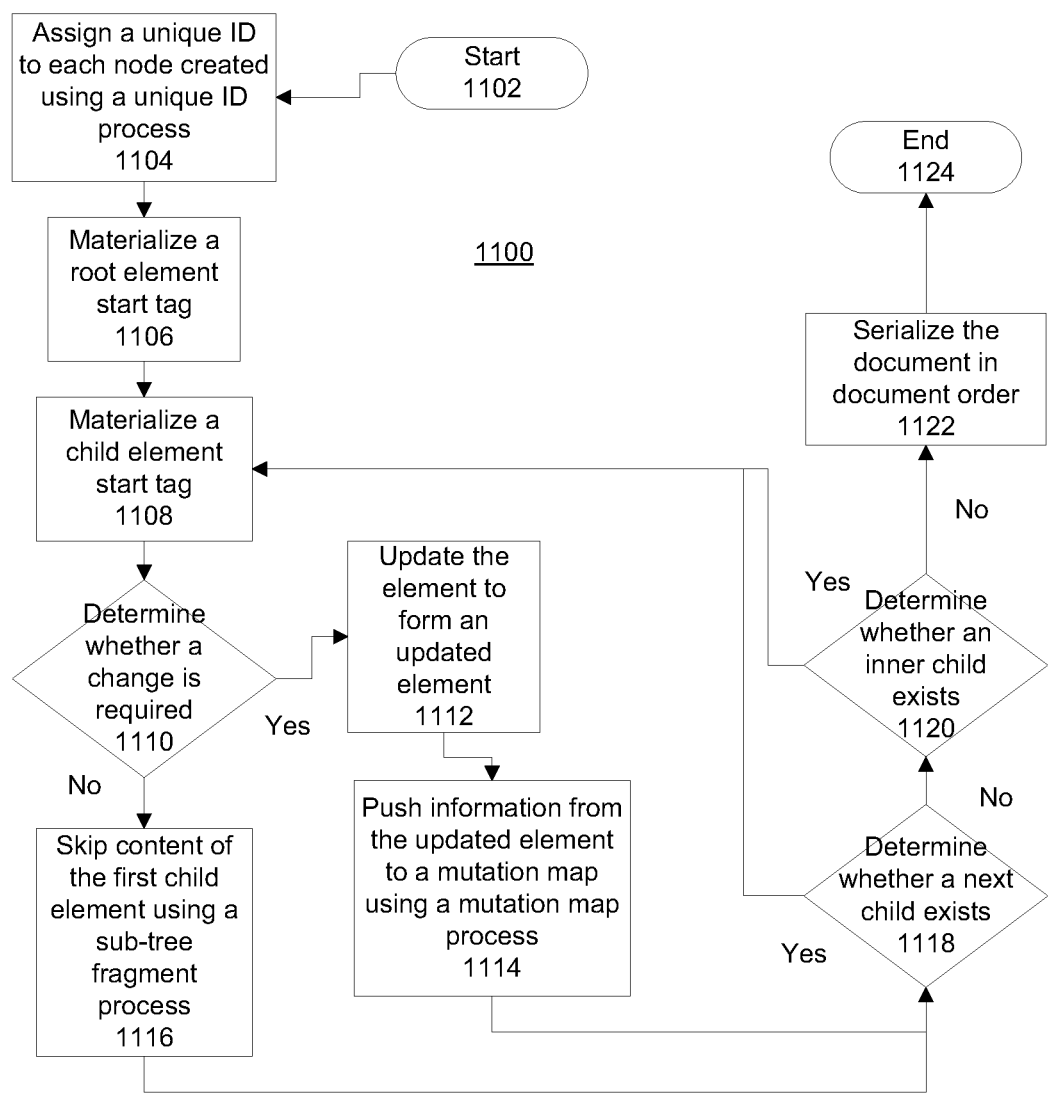
FIG. 11 is a flowchart of an update and serialization process example in accordance with various embodiments of the disclosure.

With reference to FIG. 11, a flowchart of an update and serialization process example in accordance with various embodiments of the disclosure is presented. Process 1100 provides an example of an update and serialization process used in update and serialization system 200 of FIG. 2.

Process 1100 starts (step 1102) and assigns a unique ID to each node created (step 1104). Assigning a unique ID uses the unique identifier process of process 800 of FIG. 8. Process 1100 materializes a root element start tag (step 1106). The root element is the first element of the document structure being processed. Process 1100 materializes a child element start tag (step 1108). The child element is a first child of the root element.

Process 1100 determines whether a change is required (step 1110). A change may be required to the child element to update information associated with the child element. When a determination is made that a change is required, a "yes" result is obtained. When a determination is made that a change is not required, a "no" result is obtained.

When a "no" result is obtained in step 1110, process 1100 skips the content of the child element using a sub-tree fragment process described in sub-tree fragment process 700 of FIG. 7. When a "yes" result is obtained in step 1110, process 1100 updates the element to form an updated element (step 1112). Process 1100 pushes information from the updated element to a mutation map using mutation map process of process 900 of FIG. 9 (step 1114).

Process 1100 determines whether a next child exists (step 1118). When a determination is made that child exists, a "yes" result is obtained. When a determination is made that a child does not exist, a "no" result is obtained. When a "yes" result is obtained, process 1100 loops back to step 1108 to process remaining child elements. When a "no" result is obtained process 1100 determines whether an inner child exists (step 1120). When a determination is made that an inner child exists, a "yes" result is obtained. When a determination is made that an inner child does not exist, a "no" result is obtained.

When a "yes" result is obtained, process 1100 loops back to step 1108 to process remaining inner child elements. When a "no" result is obtained, process 1100 serializes the document in document order (step 1122) and terminates thereafter (step 1124).

Thus is provided in one illustrative embodiment, a computer-implemented process for updating and serialization, which assigns a unique ID to each node created in a document, materializes a root element start tag of the document, materializes a start tag for a child element of the root element and determines whether a change is required. Responsive to a determination that a change is not required, skips content of the child element and responsive to a determination that a change is required, updates the child element to form an updated element. The computer-implemented process further pushes updated information for the child element into a mutation map and serializes the document using the mutation map.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer-implemented method for updating and serialization of a document, comprising:
   assigning a unique ID to each node created in the document according to a global integer counter for each node built, comprising:
   determining whether a given node is revisited;
   in response to determining that the given node is revisited, appending a predefined symbol for each sub-tree level of the given node to a node ID of the given node to form a current node ID;
   materializing a root node start tag of the document;
   materializing a start tag for a first child node, a second child node, and a third child node of the root node, wherein the first child node, the second child node, and the third child node are sibling nodes, wherein the second child node is ordered between the first child node and the third child node;
   determining whether a data value change to the first child node, the second child node, and the third child node is required;

in response to determining that the data value change to the first child node and any sub-nodes of the first child node are not required, skipping first content of the first child node and the sub-nodes of the first child node, and creating a first reference to the first skipped content;

in response to determining that the data value change to the second child node is required, creating an updated node in memory to replace the second child node and creating a second reference to the updated node;

in response to determining that the data value change to the third child node any sub-nodes of the third child node are not required, skipping second content of the third child content and the sub-nodes of the third child nodes, and creating a third reference to the second skipped content;

pushing the first reference, the second reference, and the third reference into a mutation map; and serializing the document using the first reference, the second reference, and the third reference in the mutation map, wherein the serialized document comprises the first skipped content obtained from the document, the updated node, and the second skipped content obtained from the document.

2. The computer-implemented method of claim 1, wherein the assigning the unique ID to each node created in the document further comprises:
comparing two node IDs for a document order using the current node IDs;
identifying a node with a lower node ID to form an identified node; and
placing the identified node in the document prior to a remaining node of the two node IDs.

3. The computer-implemented method of claim 1, wherein the creating of the first reference to the skipped content further comprises:
identifying a skipped sub-tree region of the document to form an identified region;
creating the first reference to data of the identified region;
collecting contexts pertaining to the identified region to form collected contexts;
encapsulating data content and the collected contexts into a skipped sub-tree fragment; and
storing the skipped sub-tree fragment into a skipped node.

4. The computer-implemented method of claim 1, wherein the pushing of first reference and the second reference node into the mutation map further comprises:
receiving a mutated node to form a received node;
identifying an insertion point in the mutation map for the received node to form an identified insertion point;
adding the second reference to the received node at the identified insertion point in the mutation map; and
calculating a native representation corresponding to a region between the received node and siblings of the received node.

5. The computer-implemented method of claim 1, wherein the serializing the document using the mutation map further comprises:
determining whether a received node has contents mutated;
in response to determining that the received node does not have contents mutated, defining a region item as a next item in the mutation map using the first reference for reuse of the skipped content from the document; and
in response to determining that the received node has contents mutated, traversing content of the received node as a mutated node using the second reference.

6. The computer-implemented method of claim 5, wherein the region item further comprises:
a region of native data suitable for the reuse comprising sub-tree content associated with the received node.

7. A computer program product for updating and serialization a document, comprising:
a computer readable storage device containing computer executable program code stored thereon, the computer executable program code comprising:
computer executable program code for assigning a unique ID to each node created in the document according to a global integer counter for each node built, comprising:
computer executable program code for determining whether a given node is revisited;
computer executable program code for, in response to determining that the given node is revisited, appending a predefined symbol for each sub-tree level of the given node to a node ID of the skipped node to form a current node ID;
computer executable program code for materializing a root node start tag of the document;
computer executable program code for materializing a start tag for a first child node, a second child node, and a third child node of the root node, wherein the first child node, the second child node, and the third child node are sibling nodes, wherein the second child node is ordered between the first child node and the third child node;
computer executable program code for determining whether a data value change to the first child node, the second child node, and the third child node is required;
computer executable program code for skipping first content of the first child node and any sub-nodes of the first child node, and creating a first reference to the first skipped content in response to determining that the data value change to the first child node and the sub-nodes of the first child node is not required;
computer executable program code for creating an updated node in memory to replace the second child node and creating a second reference to the updated node in response to determining that the data value change to the second child node is required;
computer executable program code for skipping second content of the third child node and any sub-nodes of the third child node, and creating a third reference to the second skipped content in response to determining that the data value change to the third child node and the sub-nodes of the third child node is not required;
computer executable program code for pushing the first reference, the second reference, and the third reference into a mutation map; and
computer executable program code for serializing the document using the first reference, the second reference, and the third reference in the mutation map, wherein the serialized document comprises the first skipped content obtained from the document, the updated node, and the second skipped content obtained from the document.

8. The computer program product of claim 7, wherein computer executable program code for assigning the unique ID to each node created in the document further comprises:
computer executable program code for comparing two node IDs for a document order using the current node IDs;
computer executable program code for identifying a node with a lower node ID to form an identified node; and
computer executable program code for placing the identified node in the document prior to a remaining node of the two node IDs.

9. The computer program product of claim 7, wherein computer executable program code for creating the first reference to the skipped content further comprises:
- computer executable program code for identifying a skipped sub-tree region of the document to form an identified region;
- computer executable program code for creating the first reference to data of the identified region;
- computer executable program code for collecting contexts pertaining to the identified region to form collected contexts;
- computer executable program code for encapsulating data content and the collected contexts into a skipped sub-tree fragment; and
- computer executable program code for storing the skipped sub-tree fragment into a skipped node.

10. The computer program product of claim 7, wherein computer executable program code for pushing the first reference and the second reference into the mutation map further comprises:
- computer executable program code for receiving a mutated node to form a received node;
- computer executable program code for identifying an insertion point in the mutation map for the received node to form an identified insertion point;
- computer executable program code for adding the second reference to the received node at the identified insertion point in the mutation map; and
- computer executable program code for calculating a native representation corresponding to a region between the received node and siblings of the received node.

11. The computer program product of claim 7, wherein computer executable program code for serializing the document using the mutation map further comprises:
- computer executable program code for determining whether a received node has contents mutated;
- computer executable program code for defining a region item as a next item in the mutation map using the first reference for reuse of the skipped content from the document, in response to determining that the received node des onto have contents mutated; and
- computer executable program code for traversing content of the received node as a mutated node using the second reference, in response to determining that the received node has contents mutated.

12. The computer program product of claim 11, wherein the region item further comprises:
- a region of native data suitable for the reuse comprising sub-tree content associated with the received node.

13. A system for updating and serialization a document, comprising:
- a communications fabric;
- a memory operatively coupled to the communications fabric, wherein the memory comprises computer executable program code; and
- a processor unit operatively coupled to the communications fabric, wherein the processor unit executes the computer executable program code to direct the system to:
  - assign a unique ID to each node created in the document according to a global integer counter for each node built, comprising:
    - determine whether a given node is revisited;
    - in response to determining that the given node is revisited, append a predefined symbol for each sub-tree level of the given node to a node ID of the given node to form a current node ID;
  - materialize a root node start tag of the document;
  - materialize a start tag for a first child node, a second child node, and a third child node of the root node, wherein the first child node, the second child node, and the third child node are sibling nodes, wherein the second child node is ordered between the first child node and the third child node;
  - determine whether a data value change to the first child node, the second child node, and the third child node is required;
  - in response to determining that the data value change to the first child node and any sub-nodes of the first child node are not required, skip first content of the first child node and the sub-nodes of the first child node, and create a first reference to the first skipped content;
  - in response to determining that the data value change to the second child node is required, creating an updated node in memory to replace the second child node and create a second reference to the updated node;
  - in response to determining that the data value change to the third child node and any sub-nodes of the third child node are not required, skip second content of the third child node and the sub-nodes of the third child node, and create a third reference to the second skipped content;
  - push the first reference, the second reference, and the third reference into a mutation map; and
  - serialize the document using the first reference, the second reference, and the third reference in the mutation map, wherein the serialized document comprises the first skipped content obtained from the document, the updated node, and the second skipped content obtained from the document.

14. The system of claim 13, wherein the processor unit executes the computer executable program code to assign the unique ID to each node created in the document further directs the system to:
- compare two node IDs for a document order using the current node IDs;
- identify a node with a lower node ID to form an identified node; and
- place the identified node in the document prior to a remaining node of the two node IDs.

15. The system of claim 13, wherein the processor unit executes the computer executable program code to create the first reference to the skipped content further directs the system to:
- identify a skipped sub-tree region of the document to form an identified region;
- create the first reference to data of the identified region;
- collect contexts pertaining to the identified region to form collected contexts;
- encapsulate data content and the collected contexts into a skipped sub-tree fragment; and
- store the skipped sub-tree fragment into a skipped node.

16. The system of claim 13, wherein the processor unit executes the computer executable program code to push the first reference and the second reference into the mutation map further directs the system to:
- receive a mutated node to form a received node;
- identify an insertion point in the mutation map for the received node to form an identified insertion point;
- add the second reference to the received node at the identified insertion point in the mutation map; and
- calculate a native representation corresponding to a region between the received node and siblings of the received node.

17. The system of claim 13, wherein the processor unit executes the computer executable program code to serialize the document using the mutation map further directs the system to:
  determine whether a received node has contents mutated;
  in response to determining that the received node does not have contents mutated, define a region item as a next item in the mutation map using the first reference for reuse of the skipped content from the document; and
  in response to determining that the received node has contents mutated, traverse content of the received node as a mutated node using the second reference.

* * * * *

UNITED STATES PATENT AND TRADEMARK OFFICE
CERTIFICATE OF CORRECTION

| | | |
|---|---|---|
| PATENT NO. | : 8,627,202 B2 | Page 1 of 1 |
| APPLICATION NO. | : 12/889330 | |
| DATED | : January 7, 2014 | |
| INVENTOR(S) | : Arthur L. De Magalhaes | |

It is certified that error appears in the above-identified patent and that said Letters Patent is hereby corrected as shown below:

On the Title Page, Item (75), correct Inventor name from "Arthus L. De Magalhaes" to
--Arthur L. De Magalhaes--

Signed and Sealed this
Eighteenth Day of March, 2014

Michelle K. Lee
*Deputy Director of the United States Patent and Trademark Office*